US010297175B2

(12) United States Patent
McGrath et al.

(10) Patent No.: US 10,297,175 B2
(45) **Date of Patent: *May 21, 2019**

(54) MULTI-PANEL DISPLAY PROJECT BOARD WITH INTEGRAL HEADER WHOSE PANELS PIVOT AND WITH CREASES HAVING BEADED PORTIONS

(71) Applicant: Royal Consumer Products LLC, Norwalk, CT (US)

(72) Inventors: Craig McGrath, Pawling, NY (US); Steven A. Schulman, Norwalk, CT (US)

(73) Assignee: Royal Consumer Products LLC, Norwalk, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/115,814

(22) Filed: Aug. 29, 2018

(65) Prior Publication Data

US 2019/0088171 A1 Mar. 21, 2019

Related U.S. Application Data

(63) Continuation-in-part of application No. 15/784,034, filed on Oct. 13, 2017, now Pat. No. 10,170,024, and a continuation-in-part of application No. 15/784,040, filed on Oct. 13, 2017, now Pat. No. 10,163,378.

(60) Provisional application No. 62/560,844, filed on Sep. 20, 2017.

(51) Int. Cl.

*G09B 29/00* (2006.01)
*G09F 15/00* (2006.01)

(52) U.S. Cl.

CPC ................................ *G09F 15/0068* (2013.01)

(58) Field of Classification Search

USPC ..... 434/408, 413, 434, 428, 430; 40/124.09, 40/124.12, 124.14, 539, 610

See application file for complete search history.

(56) References Cited

U.S. PATENT DOCUMENTS 4,759,520 A * 7/1988 Levine .................... A47G 5/00 160/114
5,293,705 A * 3/1994 Wood ................. G09F 15/0062 40/124.191
5,632,390 A * 5/1997 Podergois ............... A47F 5/116 211/149

(Continued)

OTHER PUBLICATIONS

Apollo Display Systems catalog, p. 197, ACCO Brands, 2006.
U.S. Appl. No. 15/784,034, McGrath.
U.S. Appl. No. 15/784,040, McGrath.

*Primary Examiner* — Kurt Fernstrom

(74) *Attorney, Agent, or Firm* — Robert J. Hess; Hess Patent Law Firm

(57) ABSTRACT

A blank and method of folding same into a multi-panel display board that has a plurality of panels, which include a central panel, two side panels and a header panel, and that has a plurality of beaded portions spaced apart from each other by intervening slit portions. One of the creases lies between the central panel and one of the side panels and another crease lies between the central panel and the remaining one of the side panels. The header panel flexes from a fold-in position to a fold-out position and whose opposite ends from respective creases with the two side panels.

20 Claims, 11 Drawing Sheets

(56) References Cited

U.S. PATENT DOCUMENTS

| | | | | | |
|---|---|---|---|---|---|
| 5,911,522 | A * | 6/1999 | Wood | G09F 15/0062 40/124.09 |
| 5,960,848 | A * | 10/1999 | Schirer | G09F 15/0068 160/135 |
| 7,451,800 | B2 * | 11/2008 | Johnson | G09F 15/0068 160/135 |
| 7,823,309 | B2 * | 11/2010 | Albenda | A47B 96/202 206/736 |
| 8,955,243 | B2 * | 2/2015 | Dashe | G09F 1/06 40/539 |
| 2005/0086842 | A1 | 4/2005 | Ternovits et al. | |
| 2006/0048421 | A1 * | 3/2006 | Oleksak | G09F 15/0068 40/610 |

* cited by examiner

MULTI-PANEL DISPLAY PROJECT BOARD WITH INTEGRAL HEADER WHOSE PANELS PIVOT AND WITH CREASES HAVING BEADED PORTIONS

CROSS-REFERENCE TO RELATED APPLICATIONS

U.S. provisional patent application No. 62/560,844, filed Sep. 20, 2017, from which the present application claims the benefit of priority. U.S. Utility patent application Ser. No. 15/784,034, filed Oct. 13, 2017, from which the present application asserts the benefit of priority as a continuation-in-part. U.S. Utility patent application Ser. No. 15/784,040, filed Oct. 13, 2017, from which the present application claims the benefit of priority as a continuation-in-part.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE

Not applicable.

BACKGROUND OF THE INVENTION

1. Field of Endeavor to which the Invention Pertains

The invention pertains to a multi-panel display board that has a central panel separated from two adjoining side panels on either side by crease lines and is equipped with a header panel. The side panels pivot about panel creases from a fully folded orientation to obtuse angular orientations. The header panel pivots from a fold-in position to a fold-out position so that its segments move accordingly between obtuse angular orientations and reflex angular orientations.

2. Description of Information Known to the Inventor, Including References to Specific Documents Related to the Invention, and Specific Problems Involved in the State of Technology that the Invention is Drawn Toward Conventionally, a multi-panel display project board has a central panel and has side panels that may pivot about panel creases relative to the central panel. The panels are made of a single wallboard that has two linerboards that sandwich a medium, such as corrugated cardboard. One of the linerboards may be mottled white while the other is not. The central panel may be twice the width of each of the side panels, whose widths are substantially the same.

With the side panels pivoted into a fully folded orientation, the side panels lie upon the central panel and in effect cover it. When pivoted to a deployed position, the side panels spread apart by pivoting into obtuse angular orientations relative to the central panel.

Royal Consumer Products LLC commercializes just such a multi-panel display project board. It panel creases are formed by slitting the non-mottled linerboard to give rise to the panel creases. When the side panels are moved into their obtuse angular orientations upon a smooth, flat surface with the project board self-standing upright, the side panels remain in their obtuse angular orientations. A smooth, flat surface allows free movement of the side panels across it, which would not be the case if the surface were carpeted whose fibers may interfere with such free movement.

The mottled linerboard faces the front and the non-mottled linerboard faces the rear. The medium between the two linerboards may be corrugated cardboard, corrugated fiberboard or corrugated paperboard. The medium is corrugated with C flutes, which offer better cushioning properties than B flutes and is not as rigid.

On the other hand, Artskills Inc. commercializes its own project board but its panel creases are scored or crushed. Such panel creases impose forces on the side panels to pivot them back to acute angular orientations, thereby leaving the obtuse angular orientations. Therefore, after placing the project board upon a smooth, flat surface in a self-standing manner, a header panel is needed to keep the side panels apart at desired obtuse angular orientations by securing it to the tops of the side walls.

According to a description of the G3 Sauer system that is accessible online at www.sauersystem.com/products/view-by-application/creasing/:

> Traditional creasing profiles were designed for a time when board was made from paper containing mainly virgin fiber. Today's board contains a high percentage of recycled content and is made with lightweight liners. Pairing traditional creasing profiles with recycled board can lead to rolling scores, manufacturer's gap variation, and trouble achieving a consistent crease line.
>
> While traditional male profiles force the board to stretch around the insert during creasing, leading to rolling and cracking, the G3 male profile incorporates specific geometry which conditions the board and provides relief for the inside liner. The result is improved folding, a proven reduction in manufacturer's gap variation and a higher quality finished product.

It may be that some suppliers of multi-panel display boards do not heed this advice since their male profiles or pattern lines for die cuts turn out to produce crooked creased scores rather than a well-defined, clean, straight slits or cuts. As a consequence, the crooked creased constructions may allow the side panels to swing toward their folded position on their own under resilient force from the crushed scores when the side panels are released from a spread apart position for which the side panels extend at respective oblique angles of inclination greater than ninety degrees relative to the front surface of the central panel.

One problem with a detachable header panel is that since the multi-panel display board may be used without the header panel, the header panel may become misplaced when not in use so that when the multi-panel display board is used again, the header panel cannot be found. Another problem with a detachable header panel has to do with aesthetics since the header panel is torn off from the side panel via perforations and thus perforation residue is left behind that the user may need to remove to leave a clean edge surface. There is also the risk of tearing regions away from the perforations inadvertently if a tearing force is directed other than along the perforations.

US published patent application no. 2005/0086842 discloses a portable display device and method of setting up the portable display device. The display device includes two panels that can fold inwardly relative to each other. The panels may be made of corrugated cardboard, reinforced paper, plastic, wood, corkboard, or chalkboard. There is a marquee surface integral with the display device that extends outwardly from the two panels, and a footer integral with the display device that extends away from the two panels. Two bottom braces can also be integral with and movably coupled to the two panels, respectively. Its side hinge lines include a cut extending through either the front or rear surface of its panel, but the side hinge lines may include a deformed area (also known as a crush score) that does not include any cuts.

A drawback to the portable display device of US published patent application no. 2005/0086842 is the need for support from the footer and the braces for stability of the portable display device so as to keep the side panels spread apart. It would be preferable to do without and yet retain the side panels in their spread apart orientation at respective obtuse angles relative to the central panel so as to avoid the need to make provision for such a footer and braces.

It is desired to reconfigure the multi-panel display panel with the header panel permanently attached to the multi-panel display board and with the single wallboard construction that allows an non-mottled one of the linerboards to be slit to enable creases in the mottled one of the linerboards that enable the multi-panel display board to be self-standing in a stable manner with its side panels spread apart at obtuse angles relative to the central panel.

BRIEF SUMMARY OF THE INVENTION

One aspect of the invention resides in a blank folded into a multi-panel display board and a method of folding portions of the blank into a multi-panel display project board. Preferably, the multi-panel display board has a plurality of panels that include a central panel, two side panels and a header panel and has a plurality of beaded portions spaced apart from each other by intervening slit portions. One of the creases lies between the central panel and one of the side panels and another crease lies between the central panel and the remaining one of the side panels.

The header panel has a plurality of segments that include a long segment and two shorter segments. Further ones of the creases lie between the long segment and the two shorter segments. Preferably, there are perforated creases between the two side panels and the two shorter segments of the header panel. Each of the central, side and header panels is formed of a single wallboard that has a medium between two linerboards. The medium is either corrugated cardboard, corrugated fiberboard, corrugated paperboard, foam core or cork core. The two linerboards include an non-mottled linerboard and a mottled linerboard.

To deploy, the side panels are pivoted relative to the central board about respective panel creases between a fully folded orientation and a spread-apart deployed orientation. The two side panels and the central panel define respective angles of inclination for the spread apart deployed orientation that are obtuse angles of inclination.

The angles of inclination are retained for the spread-apart deployed orientation as the obtuse angles of inclination even upon a smooth, flat surface without further support to keep the side panels spread apart. The retention arises because of a configuration of the two panel creases and because of a bottom edge of the two side panels and of the central panel are in alignment with each other.

BRIEF DESCRIPTION OF THE SEVERAL VIEWS OF THE DRAWINGS

For a better understanding of the present invention, reference is made to the following description and accompanying drawings, while the scope of the invention is set forth in the appended claims.

FIG. 8 is an isometric view of an upper corner region of the display project board of FIGS. 6 and 7 but in a self-standing upright position with the side panels swung out from the central panel and with the header panel folded in.

DETAILED DESCRIPTION OF THE INVENTION

The detailed description of the Invention from U.S. Utility patent application Ser. No. 15/784,034 and U.S. Utility patent application Ser. No. 15/784,040 are incorporated herein by reference.

Figure 1:
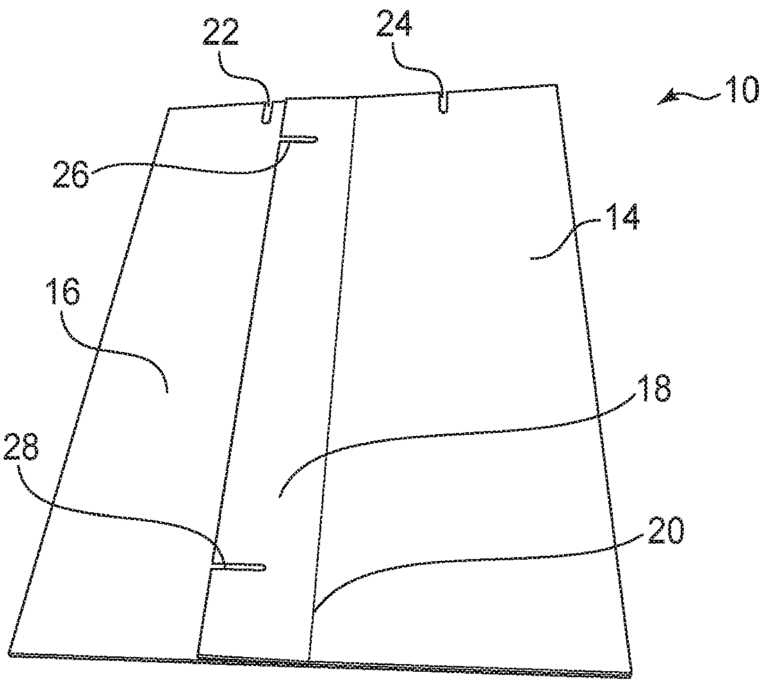
FIG. 1 (PRIOR ART)
FIG. 1 is an isometric top view of a conventional display project board in a folded state with rear sides facing out.
Figure 2:
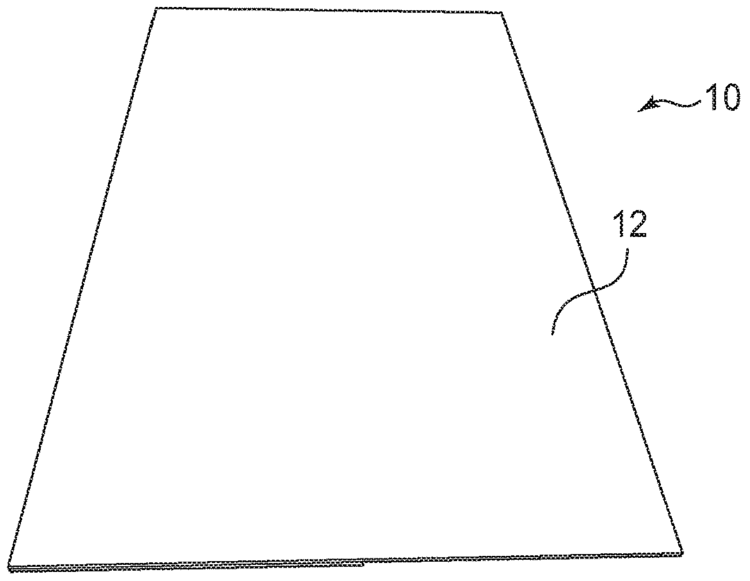
FIG. 2 (PRIOR ART)
FIG. 2 is an isometric bottom view of the conventional display project board in the folded state of FIG. 1 with rear sides facing out.
Figure 3:
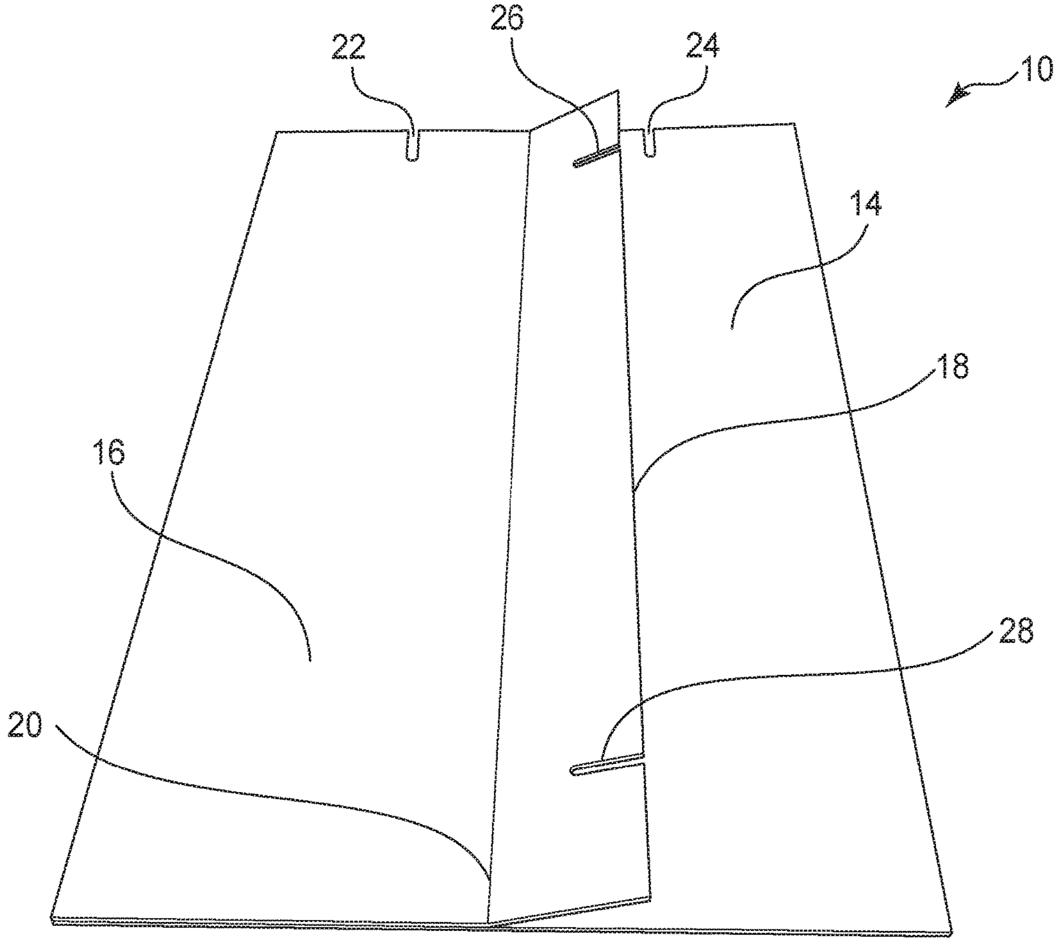
FIG. 3 (PRIOR ART)
FIG. 3 is an isometric top view as in FIG. 1 but with the header panel partially folded back to show its front side.

Turning to the drawings, FIGS. 1-5 show progressive views for assembly of a conventional multi-panel display project board 10 with a central panel 12, two side panels 14, 16 and a header panel 18 all commercialized together by Royal Consumer Products LLC. The display project board 10 is shipped in a folded state as shown in FIGS. 1 and 2. When unfolded fully, the display project board 10 takes on a planar flattened shape as shown in FIG. 3.

Figure 4:
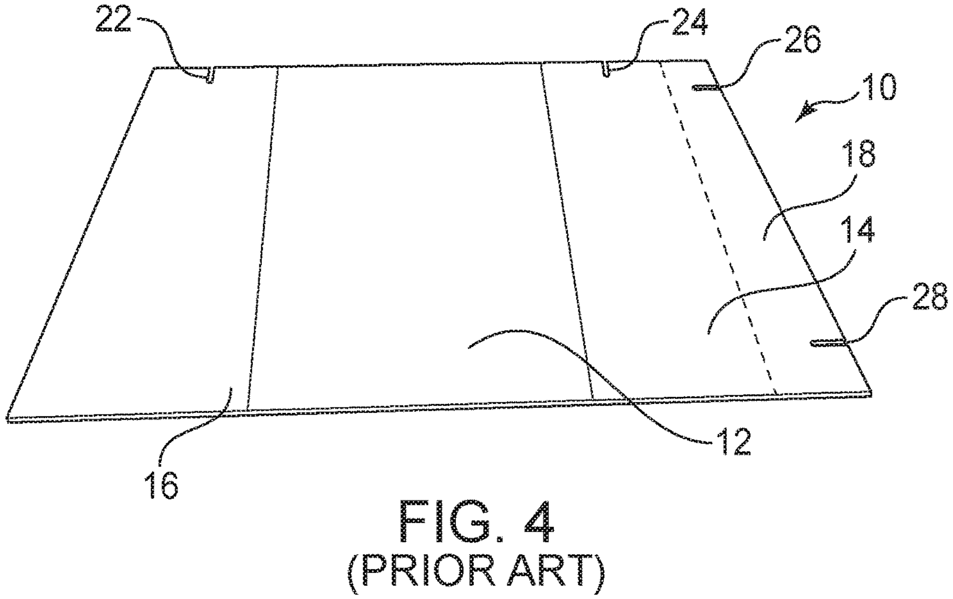
FIG. 4 (PRIOR ART)
FIG. 4 is an isometric front side view of the conventional display project board of FIGS. 1, 2 and 3 but in a flattened state.
Figure 5:
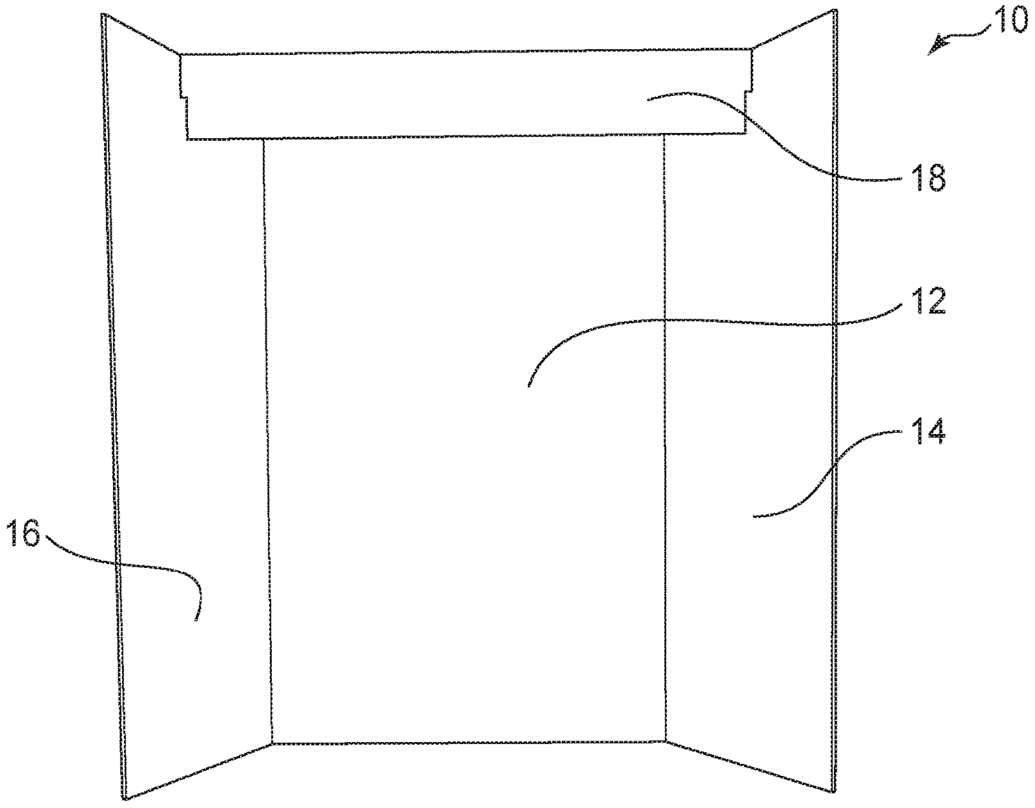
FIG. 5 (PRIOR ART)
FIG. 5 is an isometric view of the conventional display project board of FIGS. 1-4 in a self-standing upright position with the header panel torn off from a side panel and secured into the top edges of the side panels.

As shown in FIG. 4, a header panel 18 is attached to one of the side panels 14, 16 via perforations 20 and may be bent and severed along the perforations 20 to separate the header panel 18 from the rest of the multi-panel display project board. The central panel 12 separates two side panels 14, 16 by respective creases 22, 24. When the multi-panel display project board 10 is erected in the manner of FIG. 5 by swinging out its two side panels 14, 16 in the same direction relative to the central panel 12 to respective oblique angles, the header panel 18 may be fitted to the top edge of each of the side panels 14, 16 via a pair a slots or slits 26, 28 that complement corresponding slots or slits 30, 32 in the top edges of the two side panels 14, 16.

Figure 6:
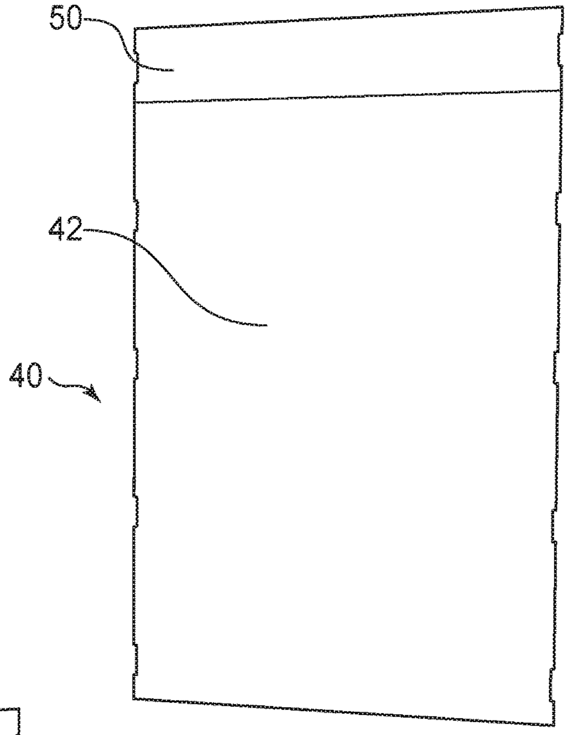
FIG. 6 is an isometric bottom view of a display project board in a folded state with rear sides facing out in accordance with the invention.
Figure 7:
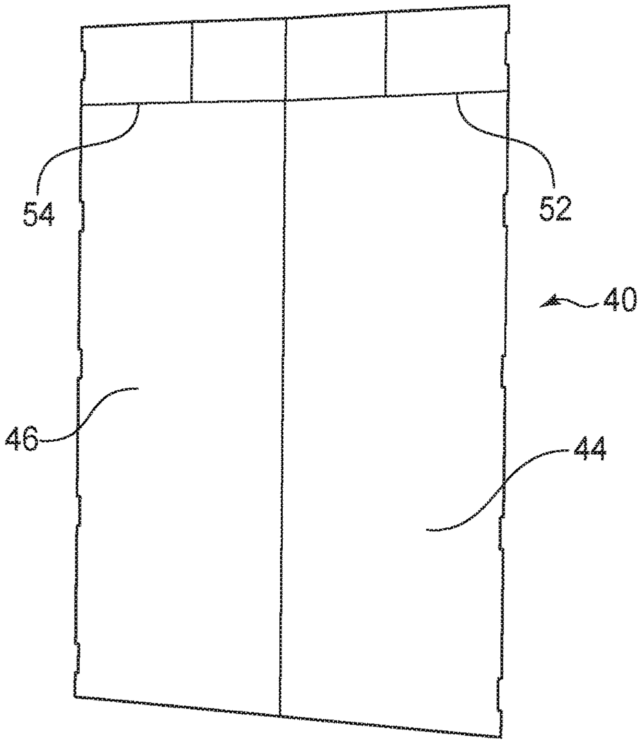
FIG. 7 is an isometric top view of a display project board in a folded state with rear sides facing out in accordance with the invention.

FIGS. 6-9 show a multi-panel project display board 40, which is shown in a folded state in FIGS. 6 and 7 and that has a central panel 42 between two side panels 44, 46 and has a fold-out header panel 48 (FIG. 9), which has a long segment 50 between two shorter segments 52, 54. The multi-panel project display board 40 may be formed from two linerboards spaced from each by a corrugated medium. One of the linerboards may be mottled and other non-mottled. The mottled linerboard may be any conventional model white linerboard, whether from bleached pulp or white grades of recycled fiber. For example, GP Harmon is one supplier of a mottled white top linerboard for which the top ply (approximately 20 percent) on a white top sheet is made from bleached pulp or white grades of recycled fiber. The non-mottled linerboard may be uncoated paperboard.

The multi-panel display project board 40 is a multi-panel board that may be unfolded from the folded state of FIGS. 6-7 into the deployed state of FIGS. 8-12. In doing so, the side panels 44, 46 are pivoted about panel creases 56, 58 between the side panels 44, 46 and the central panel 42 so as to extend at respective oblique angles relative to the central panel 42. The panel creases 56, 58, 60, 62 each have their own beaded portion 70 that are separated from other beaded portions 40 along the creases by the slit portions. The topmost beaded portion 70 is separated from the top edge of the multi-panel board by a slit portion and the bottom most beaded portion 70 is separated from the top edge of the multi-panel board by a slit portion.

Figure 8:
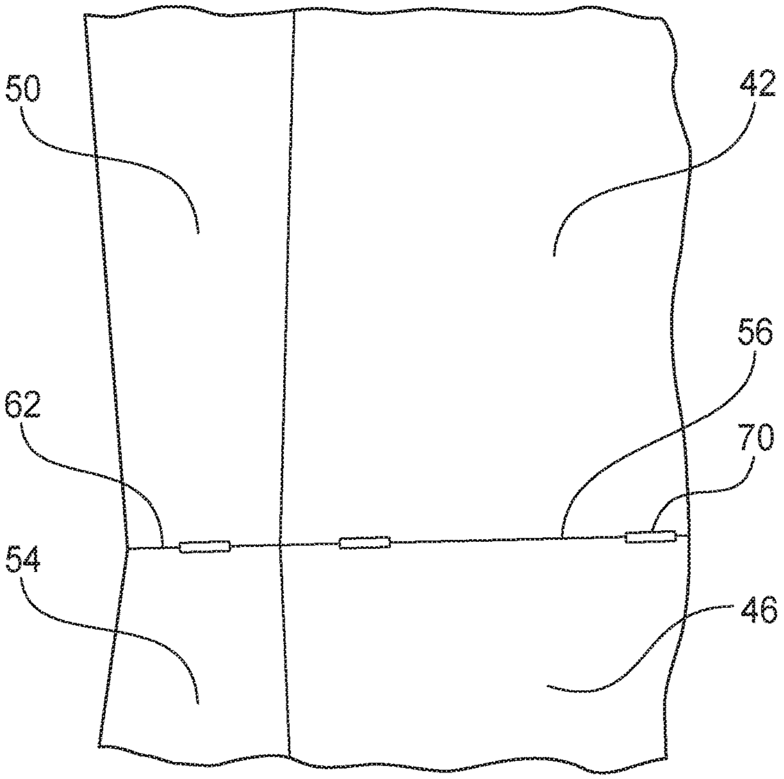
Figure 9:
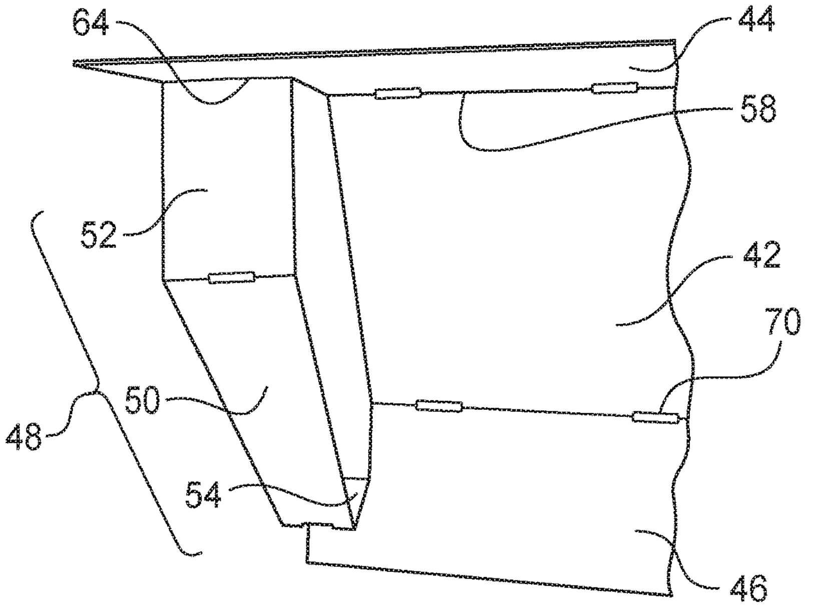
FIG. 9 is an isometric view as in FIG. 8, but with the header panel folded out.

Further, the fold-out header panel 48 is moved from a fold-in position of FIG. 8 to a fold-out position of FIG. 9. In doing so, the shorter segments 52, 54 are pivoted about associated ones of additional creases 64, 66, which are between ends of associated shorter segments 52, 54 and the two side panels 44, 46 about midway along the lengths of the two side panels 44, 46. As a consequence of such pivoting, the angles of inclination between the long segment 50 and the shorter segments 52, 54 changed from obtuse (between 90 and 180 degrees) to reflex (greater than 180 degrees) as the fold-out header panel 48 moves from the fold-in position to the fold-out position.

The beaded portions 70 for the creases 56, 58, 60, 62 render the multi-panel display project board 40 more stable for folding purposes than if the creases were instead merely formed above slits in the rear linerboard and medium as in U.S. Utility patent application Ser. No. 15/784,034. The reason is because the header panel 48 locks the rest of the project board better into a desired spread apart orientation of the side panels than is the case otherwise for U.S. Utility patent application Ser. No. 15/784,034.

Figure 10:
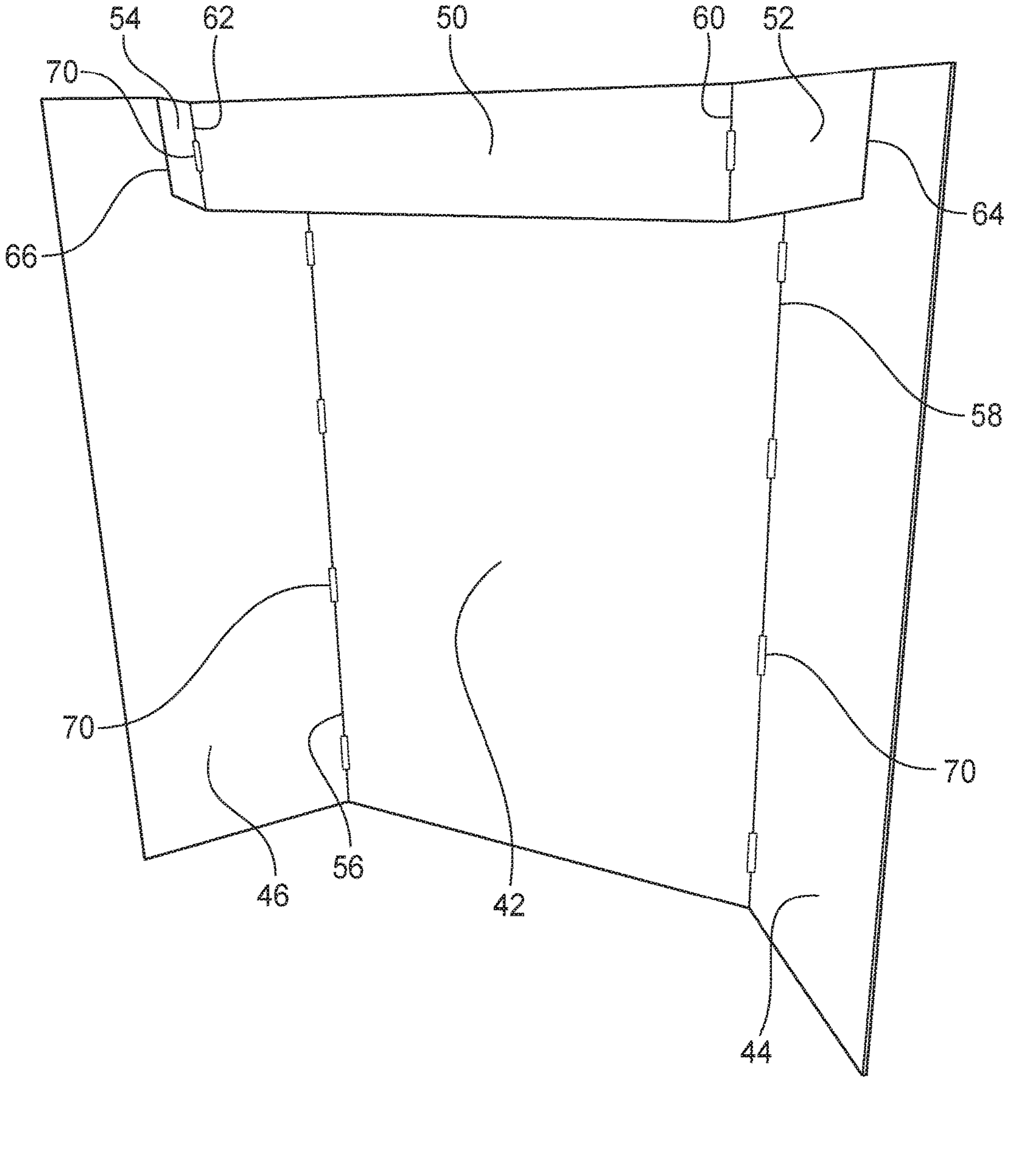
FIG. 10 is an isometric front view of the project board of FIG. 9 in a self-standing upright position with the header in a fold-out position.
Figure 11:
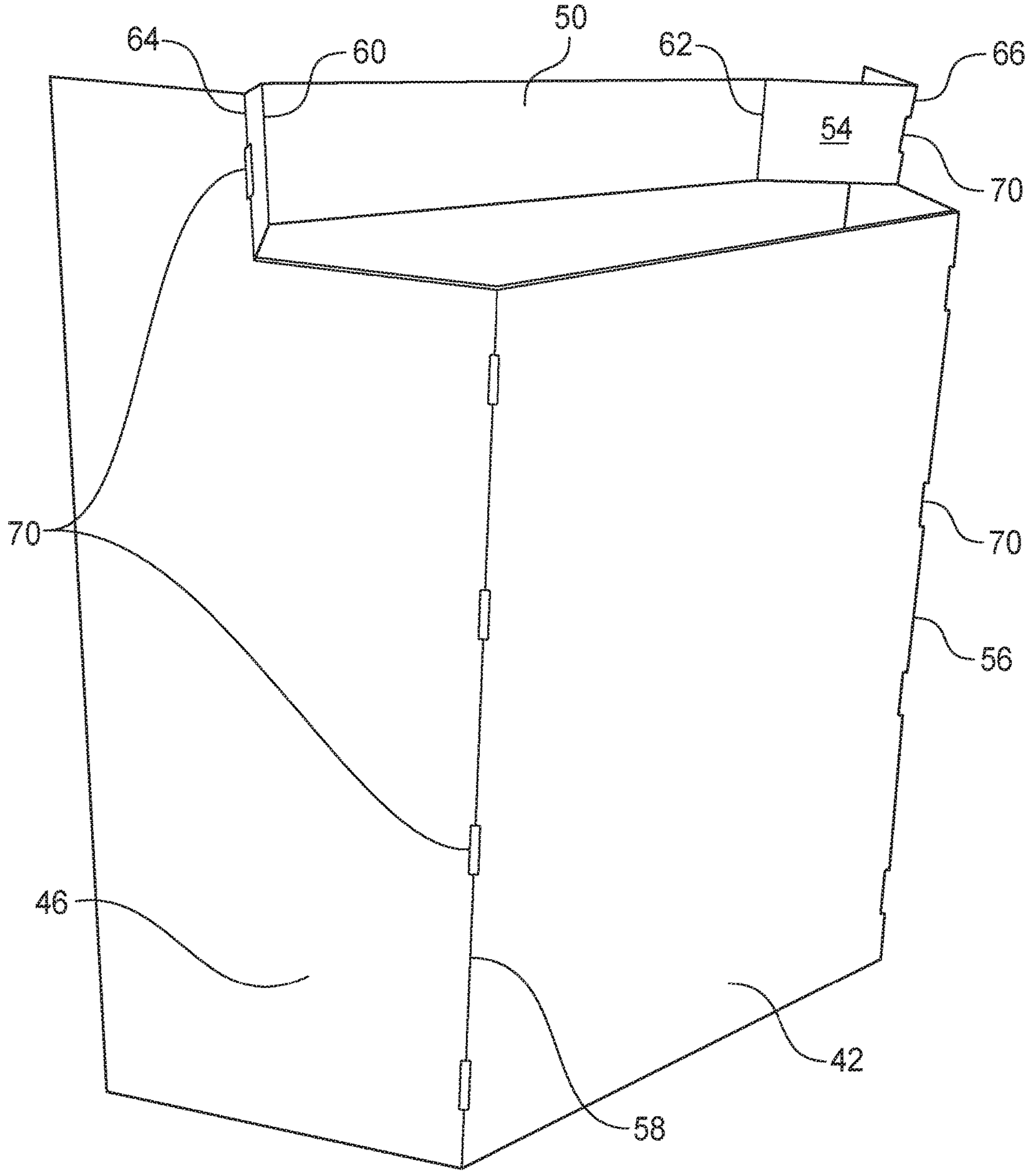
FIG. 11 is an isometric rear view of the project board of FIGS. 9 and 10.
Figure 12:
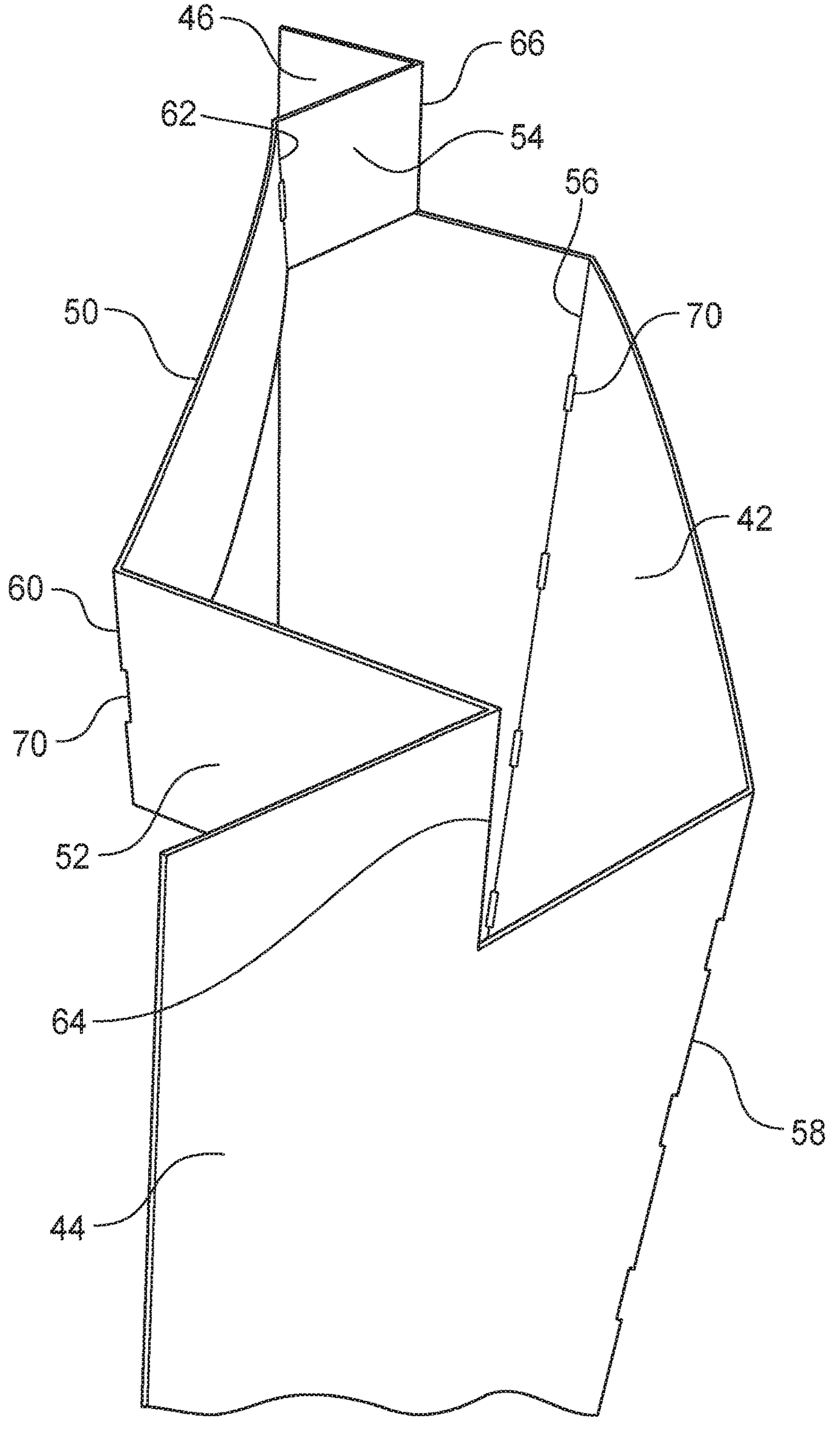
FIG. 12 is an isometric top view of the project board of FIGS. 8-10.

FIGS. 10-12 show various views of the multi-panel display project board 40 in a self-standing upright state with its fold-out header panel (comprised of the long segment 50 and two shorter segments 52, 54) in its fold-out position in accordance with the invention. The central panel 42 has a width between the panel creases 56, 58 that is wider than either of the widths of the adjoining side panels 44, 46. Preferably, the widths of the side panels 44, 46 are substantially the same so that the width of the central panel is substantially twice that of the side panel width. The fold-out header panel defines a length between the two additional creases 64, 66 that is longer than the central panel width. However, the length of the long segment 50 between the two segment creases 60, 62 is substantially the same as the center panel width. Each of the shorter segments 52, 54 define a respective length that is substantially one quarter that of the length of the long segment 50.

The side panels 44, 46 of the multi-panel board of the invention are foldable between a fully folded orientation and their obtuse angular orientation so that in the fully folded position, the two side panels 44, 46 fold over respective ones of the panel creases 56, 58 to lie over the central panel 42. Also, the two shorter segments 52, 54 fold over the respective ones of the segment creases 60, 62 to lie over the long segment 50. In the obtuse angular orientation, the side panels 44, 46 each are oriented at respective obtuse angles relative to the central panel 42.

The fold-out header panel 48 (FIG. 9) is foldable from a fold-in position (FIG. 8) and a fold-out position (FIG. 9) so that in the fold-in position, the long segment 50 is in alignment with the central panel 42 and in the fold-out position, the long segment 50 is further away from the central panel 42 than are the shorter segments 52, 54 from the central panel 42.

In the fold-in position of FIG. 8 for the header panel, the segment creases 60, 62 define the same orientation as that of the side panels 44, 46. That is, the shorter segments 52, 54 of the header panel and the side panels 46, 44, respectively, move in unison by uniformly pivoting at the creases 56, 62 and 58, 60 to define an obtuse angular orientation between the shorter segments 52, 54 of the header panel and the long segment 50 of the header panel. However, the header panel may be flexed to pivot about the additional creases 64, 66 to move into the fold-out position of FIG. 9 so that a reflex angular orientation forms between the shorter segments 52, 54 of the header panel and the long segment 50 of the header panel.

Preferably, when the header panel 48 moves between the fold-in and fold-out positions, no bend arises in the long segment 50 because of the construction of the multi-panel display project board 40, whose creases include the spaced apart beaded portions 70 whose presence counters such a tendency for bending in the long segment 50.

Figure 13:
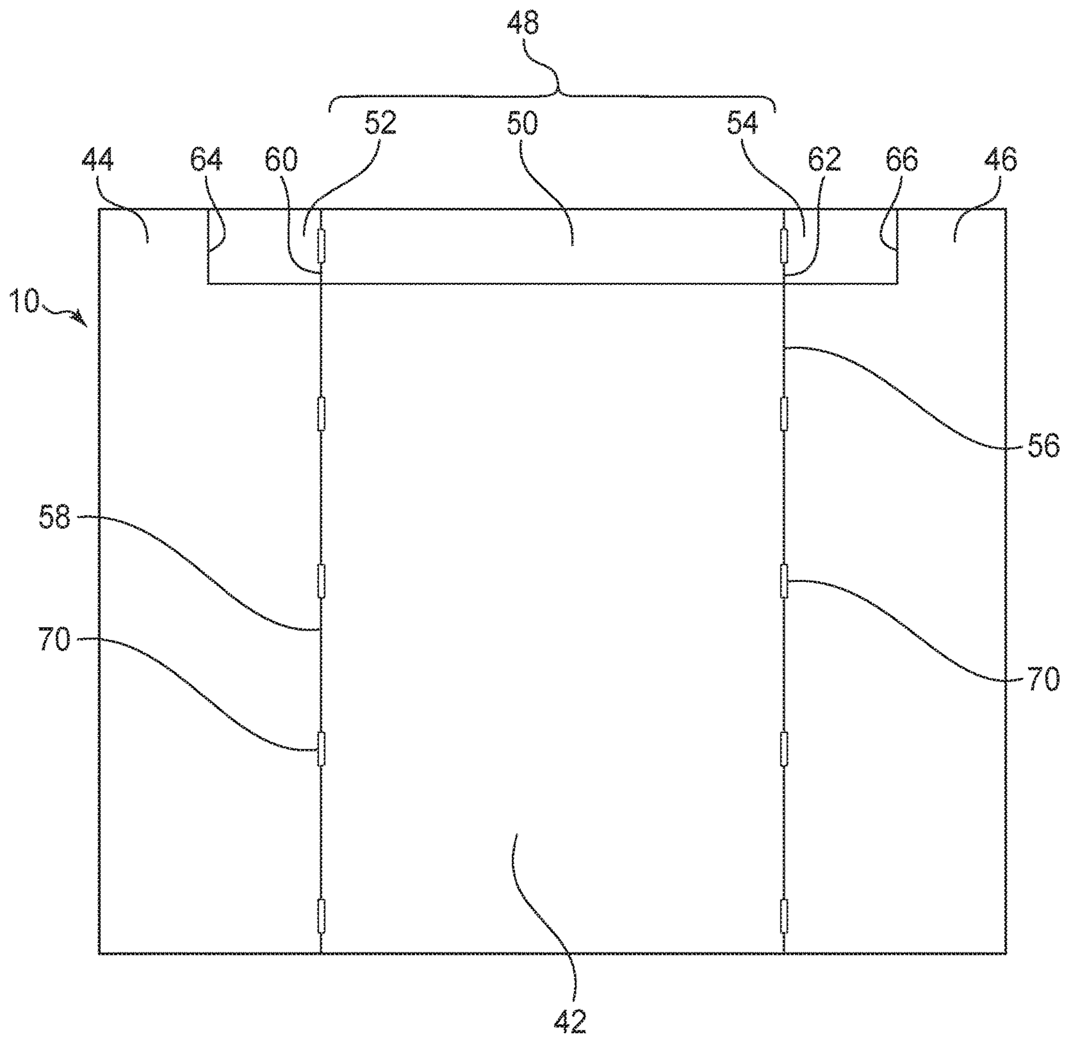
FIG. 13 is a top view of a blank in accordance with the invention.

FIG. 13 shows a blank in accordance with the invention, albeit depicting the reverse face from that of FIG. 10. The panels of the multi-panel display project board 40 may be made of the same single wallboard construction as that of the conventional multi-panel display project board 10 of FIGS. 1-5. For instance, the single wallboard construction may be that of a medium sandwiched between two linerboards, with the medium being fluted or corrugated, such as corrugated paperboard, corrugated fiberboard, or corrugated cardboard, or a core such as that of a foam core found in a conventional foam board or cork core found in a conventional cork board. If corrugated, a C flute corrugation is preferred over a B flute corrugation, although a B flute corrugation is viable. Preferably, one of the linerboards is mottled and the other is non-mottled.

In accordance with the invention, both the mottled liner board and the non-mottled linerboard as well as the medium between have alternating intact beaded portions 7—and intervening slit portions. That is, the intact beaded portions 70 are spaced apart from each other in succession by respective ones of the slit portions. The slit portions penetrate through an entirety of the mottled linerboard and the non-mottled linerboard as well as the medium between them. The beaded portions 70 are creased and become somewhat crushed to become indented or recessed as best seen in FIGS. 6, 7, 11 and 12.

As concerns foamboard, the subject matter from U.S. patent application publication no. US 2011/0239,505 A1 and US patent application publication no. US 2012/0251816 A1 are incorporated herein by reference both of which being filed on behalf of Royal Consumer Products LLC. The former patent application mentions a multi-panel display has at least two foamboard panels with a foam core and outer layers, and a web hinge connecting adjacent foam board panels. The latter patent mentions a multi-layer construction of foamboard that has high integrity and durability because it addresses the problem of paper that can separate from the foam core, particularly at the corners. If desired, the web hinges may be dispensed with in accordance with the invention and instead creases may be formed by slitting one of the liner panels and cutting through the foam core. If desired, a cork core may be substituted for the foam core.

Figure 14:
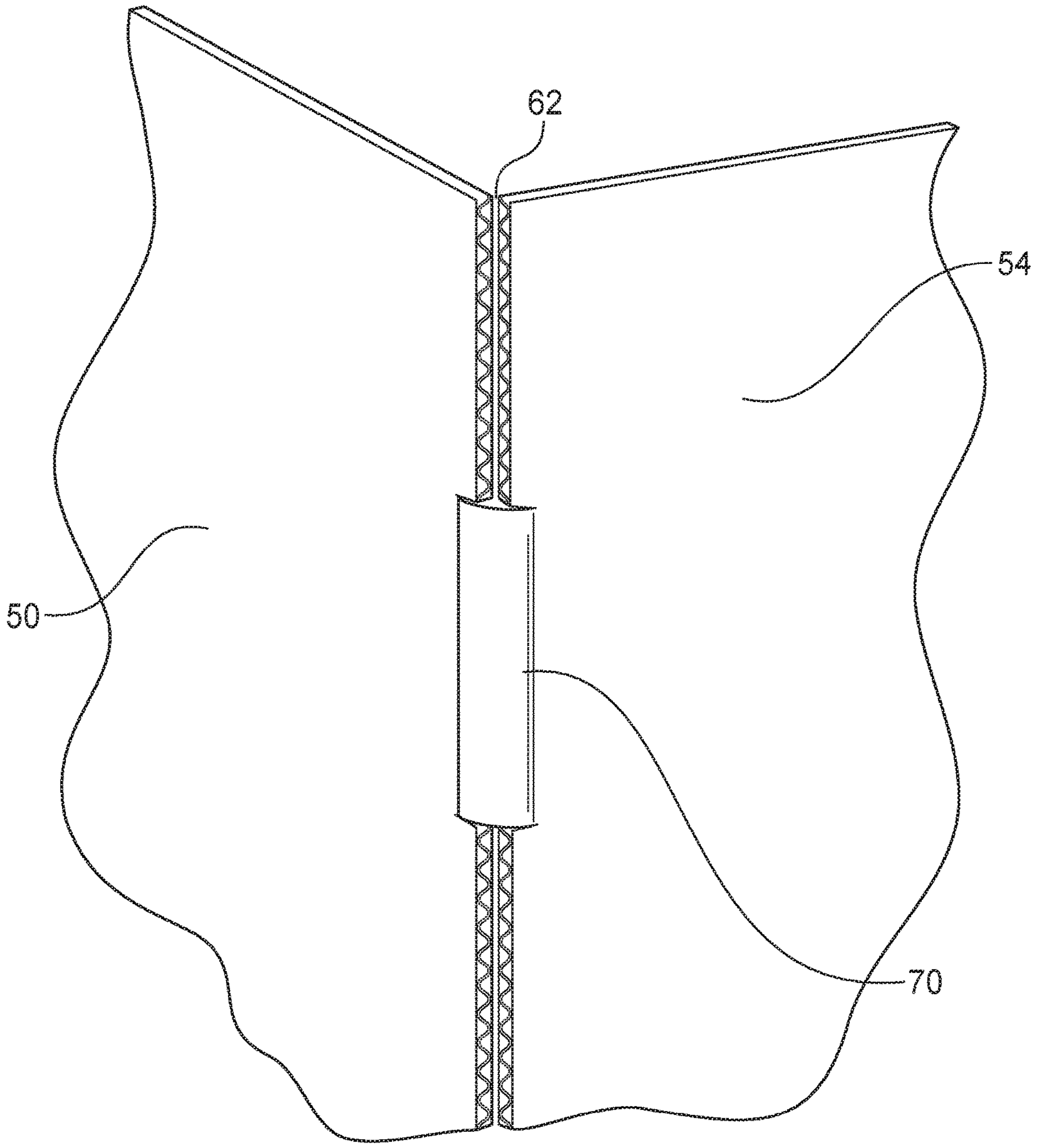
FIG. 14 is a partially broken isometric view showing a beaded portion between panel slits.

FIG. 14 shows the beaded portion 70 adjacent slit portions on either side along the crease 62 and extending between the short segment 54 of the header panel 48 and the long segment 50 of the header panel 48. The beaded portion 70 of FIG. 14 is representative of the beaded portions 70 elsewhere, i.e., between the short segment 54 and the long segment 50 of the header panel and between the center panel 42 and each of the side panels 44, 46.

Figure 15:
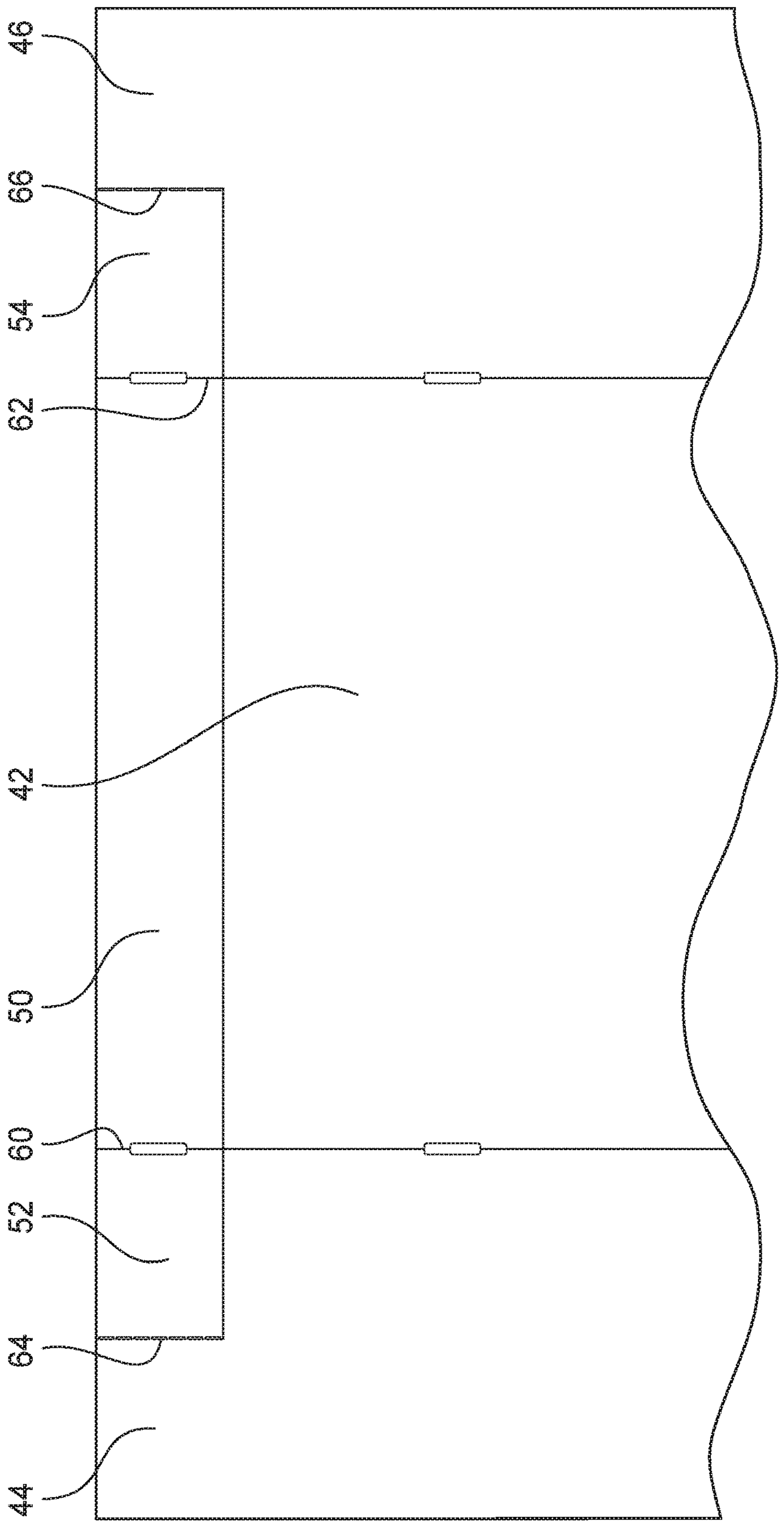
FIG. 15 is a partially broken view of the blank of FIG. 13 but indic8ted perforations in a crease line between the side panels and the header.

FIG. 15 shows that the crease lines 64 and 66 are perforated. The crease line 64 is between the side panel 44 and the short segment 52 of the header panel and the crease line 66 is between the side panel 46 and the short segment 54 of the header panel. Although perforated, the crease lines 64, 66 are not to be pulled to rip across their perforations but rather need to remain intact.

While the foregoing description and drawings represent the preferred embodiments of the present invention, various changes and modifications made be made without departing from the scope of the present invention.

What is claimed is:

1. A multi-panel display project board blank, comprising:

a plurality of panels that include a central panel, two side panels and a header panel, the header panel having a plurality of segments that include a long segment and two shorter segments, each of the panels being formed of a single wallboard that has a medium between two linerboards, the medium being selected from the group consisting of corrugated cardboard, corrugated fiberboard, corrugated paperboard, foam core and cork core; and a plurality of creases including two panel creases between the central panel and respective ones of the two side panels, two segment creases between the long panel and respective ones of the shorter segments, and two additional creases, one of the additional creases between one of the side panels and one of the shorter segments, a remaining one of the additional creases between a remaining one of the side panels and a remaining one of the shorter segments, each of the panel creases, the segment creases and the additional creases altogether having a plurality of slit portions and intact beaded portions, the intact beaded portions being spaced apart from each other in succession by respective intervening ones of the slit portions, the intervening slit portions each penetrating the linerboards and the medium between the linerboards, wherein:

the plurality of panels and the plurality of creases together form a multi-panel board that constitutes the multi-panel display project board blank, one of the side panels and one of the shorter segments are configured to pivot in unison between fully folded and fully deployed orientations, a remaining one of the side panels and a remaining one of the shorter segments are configured to pivot in unison between the fully folded and the fully deployed orientations, the two side panels overlay the central panel in the fully folded orientations and the two panels are spread apart from each other in the fully deployed orientations, the two side panels and the central panel define respective obtuse angles between them in the fully deployed orientations, the two shorter segments overlay the long segment in the fully folded orientation and spread apart from each other in the fully deployed orientations, the two shorter panels and the long panel define respective obtuse angles between them in the fully deployed orientations, and the header panel is configured to pivot about the two additional creases between a fold-in position and a fold-out position so that the long segment and the two shorter segments define respective angles of inclination between them for the fold-in position and for the fold-out position, the respective angles of inclination for the fold-in position being obtuse angles of inclination and the respective angles of inclination for the fold-out position being reflex angles of inclination.

2. The blank of claim 1, wherein the central panel defines a width between the respective panel creases that is longer than widths of each of the side panels, the two side panels having respective widths that are substantially identical.

3. The blank of claim 1, wherein the central panel has a width that extends between the respective panel creases that is shorter than a length of the header panel that extends between the additional creases.

4. The blank of claim 1, wherein the multi-panel board lacks any perforations, the multi-panel board lacks any slots extending from edges of any of the panels, each of the panel creases, segment creases and additional creases being defined by appropriate cuts beneath them, the header panel having a lengthwise edge cut that extends an entire width of the center panel and substantially midway of each of the side panels.

5. The blank of claim 1, wherein the multi-panel board lacks an angled footer below the central panel and lacks braces extending from a bottom of the side panels.

6. The blank of claim 1, wherein each of the side panels has a respective width extending from an adjacent one of the panel creases to an associated free end of the side panels, the respective additional creases being substantially midway along the respective widths of the side panels.

7. The blank of claim 1, wherein each of the shorter segments has a substantially identical respective length, each substantially identical respective length being defined between an associated pair of the segment and additional creases, the long segment having a length between the segment creases that is substantially four times longer than the substantially identical respective length of each of the shorter segments and that is substantially identical to a length of the central panel defined between the respective panel creases.

8. The blank of claim 1, wherein one of the two linerboards is a mottled linerboard that has a portion made from material selected from the group consisting of bleached pulp and white grades of recycled fiber.

9. The blank of claim 1, wherein in the fully folded orientation, the two side panels are folded over respective ones of the panel creases to lie over the central panel and the two shorter segments are folded over the respective ones of the segment creases to lie over the long segment greater then ninety degrees relative to a flat surface of the central panel.

10. The blank of claim 1, wherein the header panel is formed so that as the header panel move between the fold-in and fold-out positions, no bend arises in the long segment at least in part because of a construction of the multi-panel display project board that resists such a bend from arising.

11. The blank of claim 1, wherein the medium has a C-fluted corrugation and one of the two linerboards is a white top linerboard.

12. The blank of claim 1, wherein the multi-panel board is configured to retain the side panels in the fully folded orientations without the side panels self-pivoting and to retain the side panels in the fully deployed orientations without the side panels self-pivoting, even with the multi-panel board self-standing upright upon a smooth, flat surface.

13. The blank of claim 1, wherein the central panel and the two side panels have respective bottom edges in alignment with each other.

14. The blank of claim 1, wherein the multi-panel board lacks any pivotable footer that defines the respective bottom edge of the central panel and lacks any braces that extend from the respective bottom edges of the two side panels within respective planes that differ from respective planes within which extend the planar surfaces of the two side panels, the multi-panel board remaining stable in a self-standing and erect orientation upon a smooth, flat surface with the side panels in the fully deployed orientation and the two shorter segments in the fold-out position.

15. A method of folding panels of a multi-panel display project board blank, comprising:

pivoting one of two side panels about panel creases with respect to a central panel between fully folded and fully deployed orientations in unison with one of two shorter segments of a header panel about segment creases with respect to a long segment of the header panel between the fully folded and the fully deployed orientations, pivoting a remaining one of the two side panels about panel creases with respect to a central panel between fully folded and fully deployed orientations in unison with a remaining one of the two shorter segments of the header panel about segment creases with respect to the long segment between the fully folded and the fully deployed orientations, each of the central panel, two side panels and header panel being part of a multi-panel board that constitutes a multi-panel project board blank;

pivoting the header panel about two additional creases between a fold-in position and a fold-out position so that the long segment and the two shorter segments define respective angles of inclination between them for the fold-in position and for the fold-out position, the respective angles of inclination for the fold-in position being obtuse angles of inclination and the respective angles of inclination for the fold-out position being reflex angles of inclination, wherein:

the two side panels overlay the central panel in the fully folded orientations and the two panels are spread apart from each other in the fully deployed orientations, the two side panels and the central panel define respective obtuse angles between them in the fully deployed orientations, the two shorter segments overlay the long segment in the fully folded orientation and spread apart from each other in the fully deployed orientations, the two shorter panels and the long panel define respective obtuse angles between them in the fully deployed orientations, the central panel is between the side panels and separated from the side panels by the respective panel creases, the long segment is between the shorter segments and separated from the shorter segments by the respective segment creases, one of the shorter segments is separated from one of the side panels by one of the respective additional creases, another of the shorter segments is separated from another of the side panels by another of the respective additional creases, each of the panels being formed of a single wallboard that has a medium between two linerboards, the medium being selected from the group consisting of corrugated cardboard, corrugated fiberboard, corrugated paperboard, foam core and cork core, each of the panel creases, the segment creases and the additional creases having altogether a plurality of intact beaded portions spaced apart from each other in succession by respective intervening slit portions, the intervening slit portions each penetrating the two linerboards and the medium between the two linerboards.

16. The method of claim 15, wherein in the fully folded orientation, the two side panels are folded over respective ones of the panel creases to lie over the central panel and the two shorter segments are folded over the respective ones of the segment creases to lie over the long segment.

17. The method of claim 15, wherein the header panel is formed so that as the header panel move between the fold-in and fold-out positions, no bend arises in the long segment at least in part because of a construction of the multi-panel display project board that resists such a bend from arising.

18. The method of claim 15, wherein the medium has a C-fluted corrugation and one of the two linerboards is a white top linerboard.

19. The method of claim 15, further comprising:

retaining the side panels in the folded orientation and the deployed orientation respectively as a result of the side panels refraining from self-pivoting because of a configuration of the multi-panel board, even with the multi-panel board self-standing upright upon a smooth, flat surface.

20. The method of claim 15, further comprising:

aligning respective bottom edges of each of the central panel and the two side panels with each other.

* * * * *